(12) United States Patent
Collard et al.

(10) Patent No.: US 11,310,966 B2
(45) Date of Patent: Apr. 26, 2022

(54) AIR LEAF STRIPPING SYSTEM AND AGRICULTURAL MACHINE EQUIPPED WITH SUCH SYSTEM

(71) Applicant: ETABLISSEMENTS COLLARD, Bouzy (FR)

(72) Inventors: Yannick Collard, Bouzy (FR); Corinne Collard, Bouzy (FR)

(73) Assignee: ETABLISSEMENTS COLLARD, Bouzy (FR)

( * ) Notice: Subject to any disclaimer, the term of this patent is extended or adjusted under 35 U.S.C. 154(b) by 203 days.

(21) Appl. No.: 16/630,119

(22) PCT Filed: Sep. 25, 2017

(86) PCT No.: PCT/EP2017/074214
§ 371 (c)(1),
(2) Date: Jan. 10, 2020

(87) PCT Pub. No.: WO2019/015787
PCT Pub. Date: Jan. 24, 2019

(65) Prior Publication Data
US 2021/0144934 A1 May 20, 2021

(30) Foreign Application Priority Data
Jul. 21, 2017 (FR) ...................................... 1756961

(51) Int. Cl.
*A01G 3/08* (2006.01)
*A01B 41/04* (2006.01)
(Continued)

(52) U.S. Cl.
CPC ............ *A01G 17/026* (2013.01); *A01B 41/04* (2013.01); *A01G 3/085* (2013.01); *A01B 59/06* (2013.01)

(58) Field of Classification Search
CPC . A01G 3/00; A01G 3/08; A01G 3/085; A01G 17/026; A01B 41/04
(Continued)

(56) References Cited

U.S. PATENT DOCUMENTS 3,731,475 A * 5/1973 Balthes .................. A01D 45/16
56/27.5
4,027,733 A * 6/1977 Eisenhardt ............. A01B 39/18
171/58
(Continued)

FOREIGN PATENT DOCUMENTS

EP 2820940 1/2015
FR 2543792 10/1984
(Continued)

OTHER PUBLICATIONS

Search Report issued in Int'l Appl. No. PCT/EP2017/074214 (dated 2018).

*Primary Examiner* — David J Parsley
(74) *Attorney, Agent, or Firm* — Barnes & Thornburg LLP

(57) ABSTRACT

An air leaf stripping system and an agricultural machine equipped with such system. The system is used in viticulture for stripping leaves from vinestocks. The system can be mounted on a tractor and includes adjustment mechanism consisting of a rotary joint and coupling for rotating a housing and includes an arm that has a main longitudinal axis and includes the supply line and an attachment part intended to be mounted on the agricultural machine directly or via a frame. The supply line-is guided along the attachment part and connected to the leaf stripping members through a junction in the housing via the rotary joint. The rotating member being arranged so that the housing can be rotated about a first axis passing through the junction and
(Continued)

substantially perpendicular to the main longitudinal axis of the arm, between at least two separate angular positions relative to the first axis.

4 Claims, 4 Drawing Sheets

(51) Int. Cl.
  *A01G 17/02* (2006.01)
  *A01B 59/06* (2006.01)
(58) Field of Classification Search
  USPC .......................................................... 47/1.43
  See application file for complete search history.

(56) References Cited

U.S. PATENT DOCUMENTS

| | | | |
|---|---|---|---|
| 4,175,368 A | 11/1979 | Scheffler | |
| 6,594,982 B1* | 7/2003 | Collard | A01G 17/026 56/327.1 |
| 7,305,812 B2* | 12/2007 | Schloesser | A01G 17/026 56/230 |
| 9,894,823 B2* | 2/2018 | Gialis | A01G 17/026 |

FOREIGN PATENT DOCUMENTS

| | | |
|---|---|---|
| FR | 2862483 | 5/2005 |
| FR | 2924571 | 6/2009 |

\* cited by examiner

AIR LEAF STRIPPING SYSTEM AND AGRICULTURAL MACHINE EQUIPPED WITH SUCH SYSTEM

CROSS REFERENCE TO RELATED APPLICATIONS

This application is a U.S. nationalization under 35 U.S.C. § 371 of International Application No. PCT/EP2017/074214, filed 25 Sep. 2017, which claims priority to French Patent Application No. 1756961, filed 21 Jul. 2017. The disclosures set forth in the referenced applications are incorporated herein by reference in their entireties.

The present invention relates to a pneumatic leaf stripping system, as well as to an agricultural machine equipped with such a system. The invention is particularly applicable in the field of viticulture.

In viticulture, pneumatic leaf stripping systems such as the one described in French Patent FR 2,924,571 are known. Such a system makes it possible to remove grape vine leaves in order to eliminate leaves masking the bunches of grapes and depriving them of solar radiation which is considered to contribute to the maturation of these bunches.

Such a stripping system also makes it possible to facilitate access to the bunches, and to make them more visible, which is particularly important for manual grape harvesting.

In addition, such a system also has the purpose of ensuring good aeration of the vegetation, preventing or limiting the development of diseases, and thereby reducing the need for treatment.

Such a system generally comprises a circular casing provided with an arm for mounting on an agricultural machine, directly or via a frame, the casing being provided with a plurality of semicircular slots.

Pneumatic leaf stripping means are mounted in the casing, in the form of one or more rotating arms or spiders each provided with two compressed air projecting nozzles, these means being connected to a compressed air supply.

The stripping is thus obtained by projecting air from the nozzles in rotation, through the slots in the casing.

One of the problems encountered with such a system is that, at a constant speed of the tractor on which it is mounted, and at a constant speed of rotation of the rotating arms, stripping intensity is uniform over the entire area concerned. However, for a given stripping zone, it may be necessary to de-leaf more or fewer parts, depending on a number of parameters such as the period of the year, maturity of the bunches of grapes, geographical orientation, etc.

Furthermore, according to the time of year, it is necessary to modify the type of leaf stripping (early leaf stripping, late leaf stripping just before grape harvest). However, without manual intervention for example to change the size of the nozzles, the system is not versatile.

Nor is increasing the flow of compressed air at the supply of the system a satisfactory solution, since it leads to greater energy expenditure, noise affecting the environment, a greater risk of damaging the bunches and faster mechanical wear.

SUMMARY OF THE INVENTION

One of the aims of the invention is therefore to solve in particular the aforementioned problems. Thus, the aim of the invention is to provide a leaf stripping system which allows for versatile leaf stripping, without changing parts, and without a negative impact on the environment and operating cost.

The invention provides a pneumatic leaf stripping system, in particular for stripping grape vine leaves, intended to be mounted on an agricultural machine such as a tractor, and comprising:

a casing provided with an arm intended to be mounted on the agricultural machine directly or via a frame, and provided with at least one opening, pneumatic leaf stripping means mounted in the casing, a supply line capable of supplying compressed air to the stripping means, and thus to allow stripping by the stripping means by projecting compressed air through the opening provided in the casing, this system being characterized in that:

it has adjustment means (11, 14, 15) comprise a rotary connection and means for rotating the casing, and an arm having a main longitudinal axis and comprising the supply line and an attachment part for mounting on the agricultural machine directly or via a frame, said supply line is guided along said attachment part and is connected to the stripping means through a connection in the casing via said rotary connection, the means for rotating being configured to allow the casing to rotate about a first axis passing through said connection and substantially perpendicular to the main longitudinal axis of the arm, between at least two distinct angular positions with respect to said first axis, in such a way as to make it possible to modify the position of the stripping means with respect to the arm without hindering the supply of the stripping means with compressed air, between a first position corresponding to one of two leaf stripping intensities and a second position corresponding to the other of the two leaf stripping intensities.

In this embodiment, the system in addition to the aforementioned characteristic comprises one or more of the following characteristics, taken in isolation or according to all technically possible combinations.

Thus:

the system comprises lockable release means capable, in a blocking configuration, of blocking the casing in either of the two distinct angular positions, and in a release configuration, allowing the casing to pass from one to the other of the two distinct angular positions by rotation about an axis passing through the connection.

The system comprises means for rotating comprising a longitudinal member extending between a first point of non-rigid attachment to the casing located at a non-zero distance from the axis passing through the connection, and at least one second point of attachment to the arm.

The system comprises a second point of attachment that can assume at least two distinct positions corresponding to the two distinct angular positions of the casing, and the connection at the first point of attachment allows at least rotation of the longitudinal member with respect to the casing about a second axis parallel to the first axis.

The system comprises a longitudinal member of variable length, such as a hydraulic cylinder, able to change in length to move the casing from one to the other of the two distinct angular positions.

The system comprises the casing which is capable of passing from one to the other of the two distinct angular positions automatically via control means.

The invention also provides an agricultural machine such as a tractor, comprising a frame for mounting an auxiliary device, characterized in that it comprises at least one stripping system according to any one of the preceding characteristics mounted on the frame via the arm.

The system according to the present invention further comprises means for adjusting the stripping intensity configured to enable the stripping of a determined region from which leaves are to be stripped using at least two distinct intensities of leaf stripping, so that leaf stripping using one of the two intensities of leaf stripping removes a larger quantity of leaves or pieces of leaves of the determined region to be stripped of leaves which leaf stripping using the other of the two intensities of leaf stripping does not allow.

Such a system thus makes it possible in particular to obtain a versatile leaf stripper, using different leaf stripping intensities, to remove a greater or lesser amount of leaves or pieces of leaves of a region to be stripped of leaves, depending on a number of parameters, without having to intervene to change a part of the system, nor to vary the compressed air supply rate or the speed of advance of the machine on which the system is mounted.

In the embodiment according to the present invention, the adjustment means comprise a rotary connection and means for rotating the casing. Additionally, the arm having a main longitudinal axis and comprises the supply line and an attachment part intended to be mounted on the agricultural machine directly or via a frame, the supply line being guided along the attachment part and connected to the stripping means through a connection in the casing via the rotary connection, the means for rotating being configured to allow the casing to rotate about a first axis passing through the connection and substantially perpendicular to the main longitudinal axis of the arm, between at least two distinct angular positions with respect to said first axis in such a way as to allow the position of the stripping means relative to the arm to be modified without impeding supply of the stripping means with compressed air, between a first position corresponding to one of the two leaf stripping intensities and a second position corresponding to the other of the two leaf stripping intensities.

The rotation of the casing, or stripping head, makes it possible in particular to vary the dimensions of the region to be stripped, thus the quantity of leaves or pieces of leaves stripped in a determined stripping zone. It also makes it possible to penetrate into or against vegetation to be stripped of leaves in different ways dependent upon the angle of inclination of the leaf stripping head, which makes it possible to adapt the work to the type of vegetation and to the type of leaf stripping required.

In an embodiment according to the present invention, the stripping means comprise at least two nozzles for projecting compressed air, having different diameters, and the adjustment means comprise a selector that can assume a first and a second position in which it is capable of directing the flow of compressed air from the supply line exclusively to a first, respectively a second, of the two nozzles such that when the airflow is directed towards one of the two nozzles, the stripping is carried out using one of the two stripping intensities, and when the airflow is directed towards the other of the two nozzles, the stripping is carried out using the other of the two stripping intensities.

The use of at least two nozzles of different diameters and a selector switch makes it possible in particular to easily modify the force with which the air flow is projected onto the region to be stripped of leaves, and therefore the amount of leaves or pieces of leaves that get stripped in a determined region to be stripped of leaves. The selector makes it possible to easily modify the nozzle used for stripping, without having to dismantle the nozzle in order to replace it with another.

According to some variants, the system further comprises one or more of the following characteristics, taken in isolation or according to all technically possible combinations:

the selector comprises a valve having at least one outlet capable of alternatively communicating, by rotation of the valve about a central axis, with either of the two nozzles in the first, respectively the second, position of the selector;

the rotation of the valve is activatable by means of actuating means, either manually and/or automatically via control means;

the selector comprises two distinct outlets, each communicating with one of the two nozzles, a valve being arranged between each of the outlets and each of the nozzles and each of these valves being controlled manually and/or automatically, via control means, to block one or the other of the outlets, thus rendering inactive one or the other of the two nozzles.

The characteristics and advantages of the invention will become apparent on reading the following description, given solely by way of non-limiting example, with reference to the following appended drawings.

DETAILED DESCRIPTION OF THE INVENTION

The pneumatic leaf stripping system illustrated in FIGS. 1 to 9 comprises in particular a casing 2 having a shape resembling that of a kidney bean. Alternatively, the overall shape of the casing 2 may be oval. Two pneumatic leaf stripping means 8, 9 are mounted inside casing 2.

Figure 9:
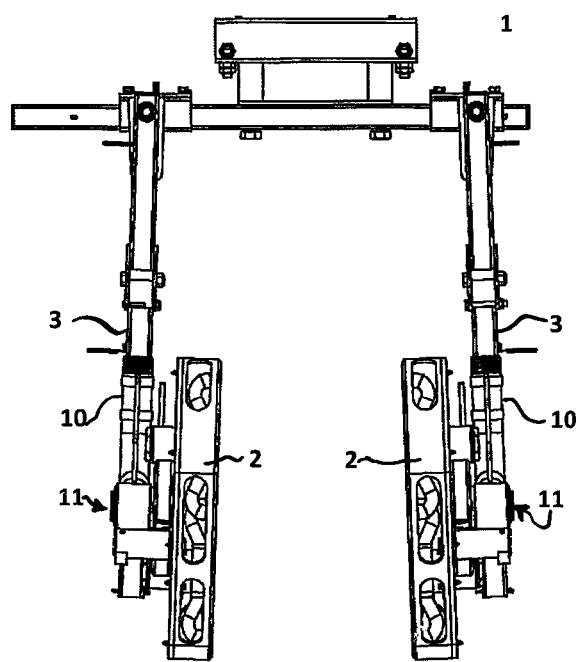
FIG. 9 is a diagrammatic representation of two stripping systems according to the invention mounted on an attachment frame of attachment equipment for an agricultural machine.

Casing 2 is provided with an arm 3, 10, 16 intended to be mounted on an agricultural machine, such as an agricultural tractor, directly or via a frame 1 as shown in FIG. 9. Specifically, in FIG. 9, two stripping systems each comprising a casing 2 and an arm 3, 10 (arm 16 is not shown in FIG. 9), are mounted on the frame 1.

Casing 2 is provided with at least one circular opening 4 on its stripping face, that is to say the face of casing 2 intended to be directed towards the vegetation to be treated. In the example shown in the drawings, casing 2 is provided with two times four semi-circular openings 4, or four openings for each stripping means 8 and 9.

In general, an example of stripping means 8, 9 is given in French Patent FR 2,924,571. In this document, the stripping means 8, 9 are housed in a casing of generally circular shape and it can be considered that they are able to be housed in a casing 2 according to the invention even when it is of a non-circular shape. They comprise a rotating arm or spider driven in rotation by a motor, this rotating arm rotating in its turn the compressed air projection nozzles.

The person skilled in the art will be able to refer to the details of the embodiments described in French Patent FR 2,924,571.

A feed line 10 is provided to feed stripping means 8, 9 with compressed air, allowing stripping by projecting compressed air by these stripping means 8, 9 through the semi-circular opening or openings 4 to 7 in casing 2.

According to a preferred embodiment of the invention, the arm 3, 10, 16 comprises the supply line 10 as well as a first attachment part 3 intended to be mounted on the agricultural machine directly, or via a frame such as the frame 1 shown in FIG. 9.

Adjustment means 11, 14, 15 for stripping intensity are provided. These means are configured to allow stripping of a determined region from which leaves are to be stripped using two or more distinct intensities of leaf stripping. Leaf stripping using one of the two intensities of leaf stripping removes a larger quantity of leaves or parts of leaves from the determined region to be stripped of leaves which could not be achieved using the other of the two intensities of leaf stripping.

In the examples illustrated in FIGS. 1 to 7, the adjustment means 11, 15 comprise a rotary connection 11 and means 15 for rotating casing 2.

The compressed air supply line 10 is guided along attachment part 3, and connected to the stripping means 8, 9 through a connection 11 in casing 2 via the rotary connection 11 (the same numerical reference 11 is used for the rotary connection and the connection to simplify the drawings). The connection 11 is fixed by attachment means 19 to casing 2.

The arm 3,10,16, in particular the line 10, having a main longitudinal axis, before bending towards the connection 11.

Figure 3:
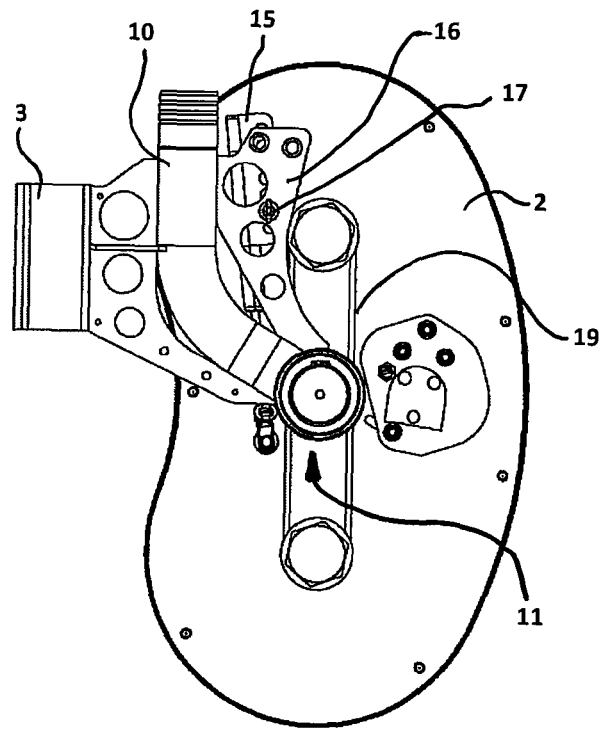
Figure 4:
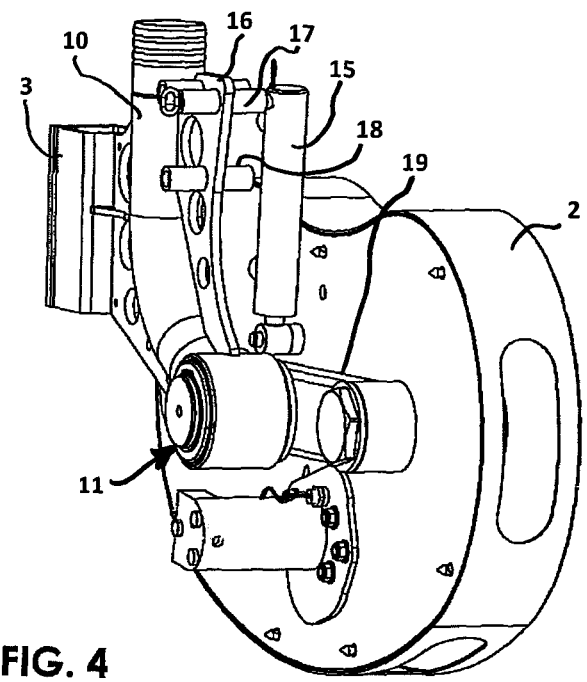
FIG. 4 is a diagrammatic representation of a second example of a stripping system according to the invention, in perspective, on the side opposite the leaf-stripping face.

The means for rotating 15 are configured to allow casing 2 to rotate about a first axis passing through the connection 11 and substantially perpendicular to the main longitudinal axis of the arm 3, 10, 16. This rotation may be between at least two distinct angular positions with respect to the first axis. In the example illustrated in FIGS. 1 to 7, the amplitude of rotation is 90°, between a first angular position in which casing 2, forming a stripping head, is substantially horizontally directed, as illustrated in FIGS. 1, 2, 4, and 5, and a second angular position in which casing 2 is substantially vertically directed, as illustrated in FIGS. 3 and 6.

Thus, rotating casing 2 makes it possible to modify the position of stripping means 8, 9 with respect to the arm 3,10,16, without hindering the supply of stripping means 8, 9 with compressed air via the line 10, between a first position corresponding to one of the two distinct stripping intensities and a second position corresponding to the other of these two distinct stripping intensities.

In the examples illustrated in FIGS. 1 to 7, the rotating means 15 comprise a longitudinal member 15 which extends between a first point where it is non-rigidly attached to casing 2, and at least one second point where it is attached to the arm 3, 10, 16.

The first point of attachment is located at a non-zero distance from the axis passing through the connection 11.

In the example illustrated in FIGS. 1, 2, 3, 5 and 6, the second point of attachment can take at least two distinct positions relative to the arm 3, 10, 16, precisely with respect to a second attachment part 16 of arms 3, 10, 16, corresponding to the two distinct angular positions of the casing 2.

The connection at the first point of attachment allows at least rotation of the longitudinal member 15 with respect to casing 2 according to a second axis parallel to the first axis.

Thus, by changing the position of the longitudinal member 15 with respect to the arms 3, 10, 16, this longitudinal member is brought into rotation 15 relative to the casing 2 at the first point of attachment, which causes the rotation of the casing 2 itself around the axis passing through the connection 11, and thus passage of the casing 2 to the other of two angular positions mentioned above.

The change in position of the second point of attachment is done manually, by unlocking release means 17, 18 which will be described later. In the example illustrated in FIG. 4, the longitudinal member 15 is of variable length. It may be, for example, a hydraulic cylinder 15. This longitudinal member 15 is therefore capable of changing its length, the change in length making it possible to move casing 2 from one to the other of the two distinct angular positions mentioned above.

The change in length of the longitudinal member 15 of variable length can be automatically actuated by appropriate control means, located near or at a distance from the longitudinal member 15. Thus, the passage of casing 2 from one to the other of the two distinct angular positions can be obtained automatically from this control means.

The lockable release means 17, 18 mentioned above make it possible, in a first so-called locking configuration, to lock casing 2 in either of the two distinct angular positions, and in a second so-called unblocking configuration, to allow casing 2 to pass from one to the other of the two distinct angular positions by rotation about the axis passing through the connection 11.

For example, as illustrated in FIGS. 1, 2, 3, 5 and 6, these lockable release means 17, 18 can take the form of a locking member 17 which cooperates with an orifice in the second attachment part 16 of the arm 3, 10, 16. At least two orifices are provided in the second attachment part 16, which correspond to the two positions of the second point of attachment between the longitudinal member 15 and the aforementioned arm 3, 10, 16.

By manually disengaging the locking member 17 from a first of the two orifices in the second attachment part 16, longitudinal member 15 is released from its connection with the arm 3,10,16, in order to allow the casing 2 to rotate. Once the desired position of casing 2 has been reached, locking member 17 is engaged with a second one of the two orifices in the second attachment part 16, in order to lock casing 2 in this second position.

A second locking member 18 cooperating with another orifice in the second attachment part 16 may be provided, in order to reinforce the blocking and/or to stabilize the position of the longitudinal member 15 along the arm 3, 10, 16.

Figure 5:
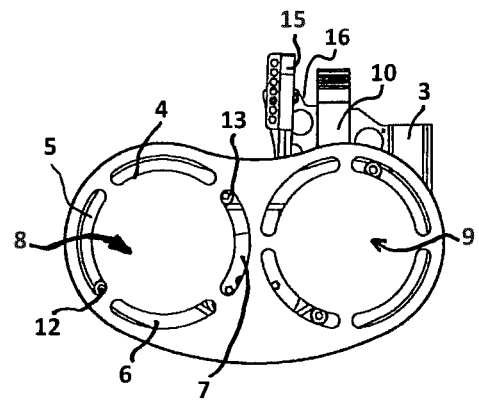
FIGS. 5 and 6 are diagrammatic representations of the stripping system of FIG. 1, showing the leaf-stripping face, respectively in horizontal and vertical positions of casing 2.
Figure 6:
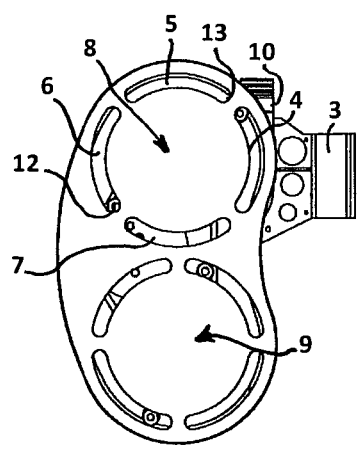
Figure 7:
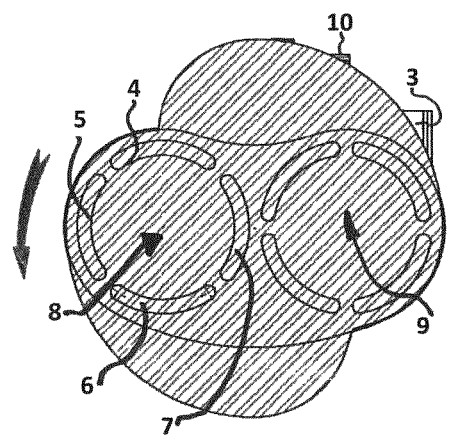
FIG. 7 is a diagrammatic representation of the area of stripping of the system of FIGS. 5 and 6.

FIGS. 5 and 6 show by way of non-limiting example the stripping system respectively in horizontal and vertical positions of casing 2, and the cross-hatched area in FIG. 7 shows the region covered by the stripping system described upon passage from one to the other of the two positions.

Thus, by changing the position of the casing 2, there are several, at least two intensities of leaf stripping in terms of the quantity of leaves or pieces of leaves removed from this area. In practice, when the system moves horizontally driven by an agricultural machine, the strip that is swept by casing 2 in the horizontal position (FIG. 5) has a smaller area than the strip swept by casing 2 in the vertical position (FIG. 6).

Figure 1:
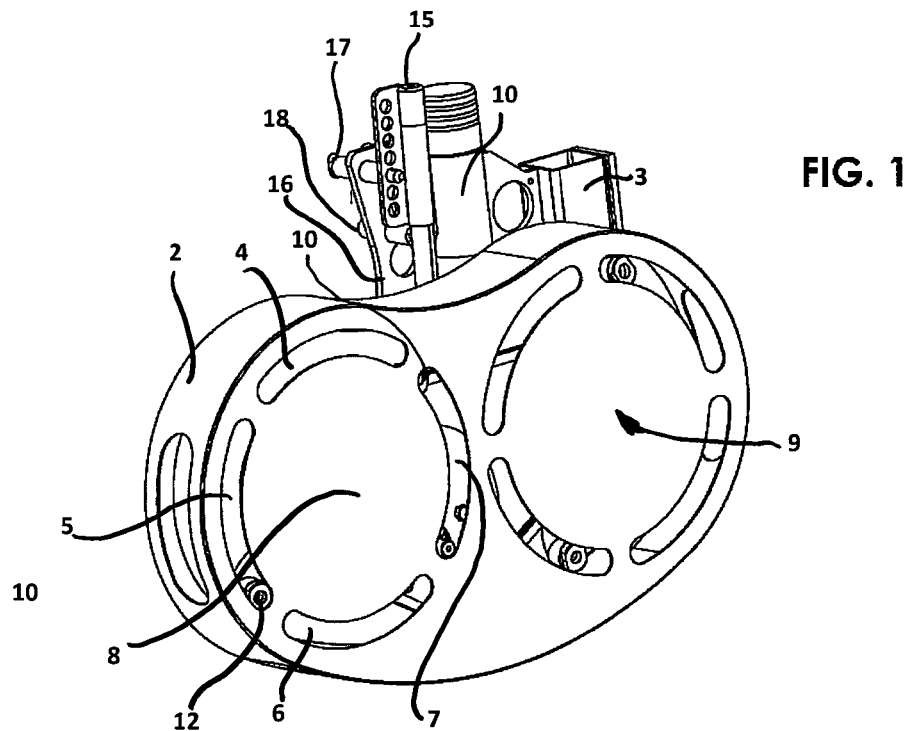
FIG. 1 is a diagrammatic representation of a first example of a leaf stripping system according to the invention, in perspective, showing the leaf-stripping face.
Figure 2:
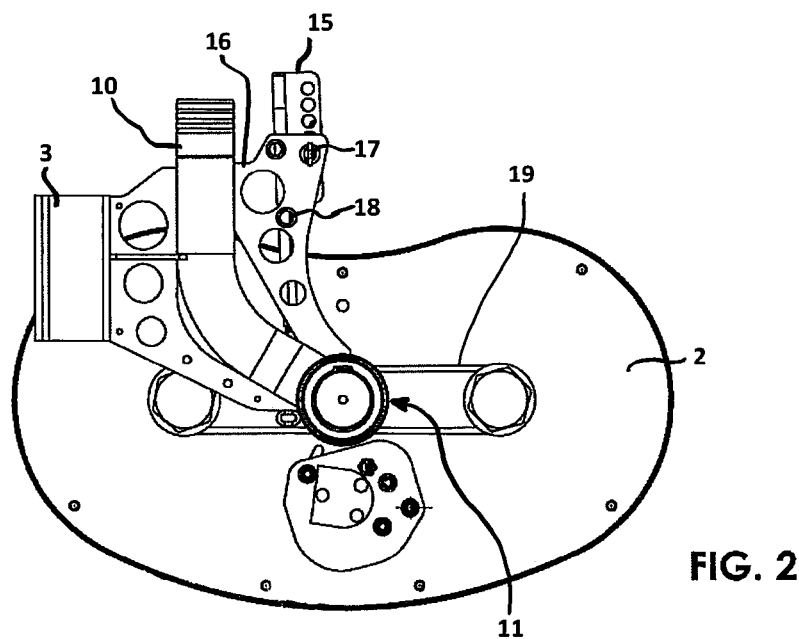
FIGS. 2 and 3 are diagrammatic representations of the stripping system of FIG. 1, viewed from the side opposite the leaf-stripping face, respectively in horizontal and vertical positions of the casing 2.

As can be seen in FIGS. 1, 5 and 6, each of stripping means 8, 9 and comprises at least two nozzles 12, 13 for projecting compressed air.

Figure 8:
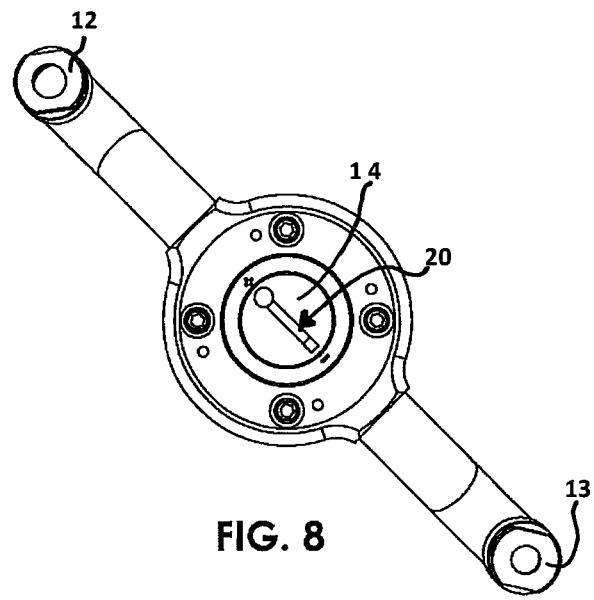
FIG. 8 is a diagrammatic representation of a part of the stripping means 8, 9 inside casing 2 of the preceding figures.

These nozzles 12, 13 are visible in greater detail in the drawings. In the embodiment of FIG. 8, the two nozzles each have a different inner diameter.

In this embodiment, the means for adjusting stripping intensity comprise a selector 14 capable of taking a first and a second position in which it is capable of directing the flow of compressed air coming from the supply line 10 exclusively towards a first 12, respectively a second 13, of the two nozzles 12, 13.

Thus, with the air flow coming from compressed air supply line 10 directed towards one of the two nozzles 12, 13, stripping is carried out using a first stripping intensity, and when the air flow is directed towards the other of the two nozzles 12, 13, stripping is carried out using another stripping intensity.

In effect, depending on the diameter of the nozzle 12, 13 supplied with compressed air, the force of the airflow projected onto a determined stripping area will be greater or lesser, and stripping intensity in terms of quantity of leaves or pieces of leaves removed from this area will be greater or lesser.

In an alternative embodiment, the selector 14 comprises a valve 14 having at least one outlet capable of alternately communicating with either of the two nozzles 12, 13 in the first, respectively the second, position of the selector 14.

To do this, the valve 14 is capable of being rotated about a central axis. This rotation can be obtained by actuating means 20, for example a slot 20 into which a tool suitable for rotating valve 14 is manually inserted.

Other actuating means are of course possible, which can be actuated manually and/or automatically using control means located close by or at a distance.

In another embodiment, the selector comprises two distinct outlets each communicating with one of the two nozzles, a valve being disposed between each of said outlets and each of the nozzles. Each of these valves is controlled by means of control means, with manual and/or automatic operation, in order to block one or the other of the outlets, so as to render one or the other of the two nozzles inactive.

Thus, when the airflow is directed towards one of the two nozzles, stripping is carried out using one of the two stripping intensities, and when the airflow is directed towards the other of the two nozzles, stripping is carried out using the other of the two stripping intensities.

The present description is given by way of example and is not limiting of the invention.

In particular, the leaf stripping system according to the invention is mainly intended for stripping leaves of leaves from grape vine but can just as well be used in other fields of agriculture in which a similar leaf stripping effect is useful.

The invention claimed is:

1. A pneumatic leaf stripping system for stripping grape vine leaves, intended to be mounted on an agricultural machine, and comprising:

a casing provided with an arm intended to be mounted on the agricultural machine directly or via a frame, comprising fixed pneumatic leaf stripping means each provided with at least one circular opening formed by four openings, a supply line capable of supplying compressed air to the stripping means, and allow stripping by the stripping means by projecting compressed air through the opening provided in the casing, adjustment means comprising a rotary connection and means for rotating the casing, the arm having a main longitudinal axis and comprising the supply line and an attachment part for mounting on the agricultural machine directly or via a frame, the supply line is guided along the attachment part and is connected to the stripping means through a connection in the casing via the rotary connection, the means for rotating are configured to allow the casing to rotate about a first axis passing through the connection and substantially perpendicular to the main longitudinal axis of the arm, between at least two distinct angular positions with respect to the first axis, the means for rotating comprise a longitudinal member extending between a first point of non-rigid attachment to the casing located at a non-zero distance from the axis passing through the connection, and at least one second point of attachment to the arm, the second point of attachment can assume at least two distinct positions corresponding to the two distinct angular positions of the casing, the connection at the first point of attachment allows at least rotation of the longitudinal member with respect to the casing about a second axis parallel to the first axis, each of stripping means comprises at least two nozzles for projecting the compressed air, the two nozzles have different inner diameters; the adjustment means for adjusting stripping intensity is capable of directing a flow of the compressed air coming from the supply line exclusively towards one of the two nozzles;

the system comprises lockable release means capable, in a blocking configuration, of blocking the casing in either of the two distinct angular positions, and in a release configuration, allowing the casing to pass from one to the other of the two distinct angular positions by rotation about an axis passing through the connection.

2. The system according to claim 1, wherein the longitudinal member is of variable length, able to change in length to move the casing from one to the other of the two distinct angular positions.

3. The system according to claim 1, wherein the casing is capable of passing from one to the other of the two distinct angular positions automatically via manual or automatic control means.

4. An agricultural machine, comprising a frame for mounting an auxiliary device comprising at least one stripping system according to claim 1 mounted on the frame via the arm.

* * * * *